(12) United States Patent
Lagares Corominas

(10) Patent No.: US 10,973,237 B2
(45) Date of Patent: Apr. 13, 2021

(54) NEEDLE CLEANING SYSTEM INCLUDING A NEEDLE CLEANING MACHINE AND A PLURALITY OF NEEDLES FOR INJECTING FLUIDS INTO MEAT PRODUCTS

(71) Applicant: Metalquimia, SA, Girona (ES)

(72) Inventor: Narcis Lagares Corominas, Basalu (ES)

(73) Assignee: Metalquimia, SA, Girona (ES)

( * ) Notice: Subject to any disclaimer, the term of this patent is extended or adjusted under 35 U.S.C. 154(b) by 221 days.

(21) Appl. No.: 16/000,814

(22) Filed: Jun. 5, 2018

(65) Prior Publication Data
US 2018/0295845 A1 Oct. 18, 2018

Related U.S. Application Data

(63) Continuation-in-part of application No. 14/425,928, filed as application No. PCT/ES2013/000056 on Mar. 1, 2013, now abandoned.

(30) Foreign Application Priority Data

Mar. 5, 2012 (ES) .................. O201230464

(51) Int. Cl.
*A23C 17/00* (2006.01)
*A23B 4/28* (2006.01)
(Continued)

(52) U.S. Cl.
CPC ............ *A23B 4/28* (2013.01); *A22C 17/0053* (2013.01); *A23B 4/285* (2013.01); *B08B 9/00* (2013.01);
(Continued)

(58) Field of Classification Search
CPC .... B08B 3/02; B08B 3/04; B08B 9/00; B08B 9/02; B08B 9/032; B08B 9/0323;
(Continued)

(56) References Cited

U.S. PATENT DOCUMENTS 3,595,252 A * 7/1971 Conte ...................... B08B 9/28
134/109
3,786,825 A * 1/1974 Weisner ................... B08B 3/08
134/99.1
(Continued)

FOREIGN PATENT DOCUMENTS

DE 102007021352 A1 11/2008
ES 2281040 T3 9/2007
(Continued)

*Primary Examiner* — Joseph L. Perrin
*Assistant Examiner* — Irina Graf
(74) *Attorney, Agent, or Firm* — Robert J. Hess; Hess Patent Law Firm

(57) ABSTRACT

A needle cleaning system that backflushes an inner passage of needles (40) successively with a cleaning solution, such as caustic soda, pressurized air and a washing liquid. The needle cleaning machine has an airtight container (17) closed at the top by a support base (15) with holes (16) where a group of needles (40) are inserted in a position in which an upper portion of the needles, where an inlet opening is located, is outside the airtight container and a lower portion of the needles, where outlet ports are located, is inside the airtight container (17). The container (17) is connected to ducts (19, 21, 23, 25, 27) provided with valves (20, 24, 26, 28) by which the cleaning solution driven by a pump (29), the pressurized air (23) and the washing liquid (25) are supplied to the containers (17).

11 Claims, 4 Drawing Sheets

(51) Int. Cl.
    *B08B 9/032*     (2006.01)
    *A22C 17/00*     (2006.01)
    *B08B 9/00*     (2006.01)
    *B08B 9/02*     (2006.01)
    *A23L 13/70*     (2016.01)
    *A22C 9/00*     (2006.01)

(52) U.S. Cl.
    CPC ............ *B08B 9/0323* (2013.01); *A22C 9/001* (2013.01); *A23L 13/70* (2016.08); *A23L 13/72* (2016.08)

(58) Field of Classification Search
    CPC ... B08B 9/0328; B08B 9/08; B08B 2209/022; B08B 2203/0282; B08B 9/0321; A23B 4/28; A23B 4/285; A22C 17/0053; A22C 9/001; A22C 9/008
    See application file for complete search history.

(56) References Cited

U.S. PATENT DOCUMENTS

| | | |
|---|---|---|
| 3,893,843 A * | 7/1975 | Fry .................. A47L 15/30 134/10 |
| 3,900,339 A | 8/1975 | Filipin |
| 4,419,141 A | 12/1983 | Kunkel |
| 5,363,867 A | 11/1994 | Kawano |
| 5,507,221 A * | 4/1996 | Lagares-Corominas .................... A23B 4/28 99/532 |
| 5,567,246 A | 10/1996 | Bowden |
| 6,302,123 B1 | 10/2001 | Wilson |
| 6,379,632 B1 | 4/2002 | Kinoshita |
| 8,297,291 B1 | 10/2012 | Bluestone |
| 2003/0168082 A1 | 9/2003 | Cundith et al. |
| 2004/0129299 A1 | 7/2004 | Kocherlakota |
| 2005/0000550 A1 | 1/2005 | Fick et al. |
| 2005/0209507 A1 | 9/2005 | Suzuki |
| 2007/0199584 A1 | 8/2007 | Koch |
| 2011/0069577 A1 | 3/2011 | Rasper |
| 2011/0186081 A1 | 8/2011 | Dunn |
| 2011/0197923 A1 | 8/2011 | Battaglioli |
| 2011/0290034 A1 | 12/2011 | McDonnell |
| 2013/0092704 A1 * | 4/2013 | Tincher .................. D06F 33/00 222/1 |

FOREIGN PATENT DOCUMENTS

| | | | |
|---|---|---|---|
| IT | UD20100155 A1 * | 1/2012 | ............ A61M 5/001 |
| WO | WO 2008/135610 A1 | 11/2008 | |
| WO | WO-2012016909 A1 * | 2/2012 | ............ B08B 3/026 |
| WO | WO2014/037590 A1 | 3/2014 | |

\* cited by examiner

NEEDLE CLEANING SYSTEM INCLUDING A NEEDLE CLEANING MACHINE AND A PLURALITY OF NEEDLES FOR INJECTING FLUIDS INTO MEAT PRODUCTS

CROSS-REFERENCE TO COPENDING PATENT APPLICATIONS

This is a continuation-in-part of patent application Ser. No. 14/425,928, filed Mar. 4, 2015, which in turn is a national phase entry of international patent application no. PCT/ES2013/000056, filed Mar. 1, 2013 and now expired.

TECHNICAL FIELD

The present invention relates to a needle cleaning system including a needle cleaning machine and a plurality of needles to be cleaned, wherein the needles are designed for injecting fluids, especially brine, into meat products such as pork or similar, and optionally into fish products.

STATE OF THE PRIOR ART

There are meat products that to be preserved have to be conveniently prepared, by introducing inside them suitable fluid ingredients, basically brine. The introduction of such fluids is preferably carried out mechanically for productivity reasons.

Document WO 2008/135610 (publication No. PCT/ES2008/000216) relates to a machine for injecting treatment fluids, especially brine, into meat products, which comprises one or more injection heads, each one of them integrating a plurality of hollow, parallel and retractable needles. This injection head is arranged and actuated so as to move upwards/downwards along a double vertical length, with respect to a supporting plane in a conveyor that conveys the meat pieces. Each needle has an inner longitudinal passage, an inlet opening in communication with said inner passage located in an upper portion of the needle and a plurality of outlet ports in communication with said inner passage located in a lower portion of the needle. The inlet opening of each needle is arranged in an injection chamber of pressurized fluid connected to valves for feeding said fluid.

Said injection needles must periodically be cleaned for future reuse thereof, an operation that is usually carried out by detaching the needles from the injection head and leaving them soaking in a cleaning solution for a predetermined time period, which is usually relatively long, for example approximately 24 hours. This operation ends up being time-consuming and unproductive.

Document US 2004129299 A1 discloses a pipette washer comprising a plurality of cells for receiving pipettes. Each pipette has a hollow shaft with an open lower end and an open upper end. Each of the cells comprises a top opening for receiving the open lower end of a pipette to be washed and a bottom opening. A support member supports the cells with the top opening accessible to receive pipettes to be washed. A hose system is coupled to the bottom opening on the cells. A supply hose is connected to the hose system. Each of the cells is supported in the support member. Each of the support cells has a top width wider than a bottom width. In accordance with the preferred embodiment, each cell member is conical in shape.

The pipette washer according to the cited document US 2004129299 A1 is not useful for cleaning needles having a hollow shaft with a lower closed end because the top opening of each cell will be shut by the closed tip lower end of the needle due to the conical shape of the cell and no fluid communication will occur between the cell and the needle.

Document US 2005000550 A1 discloses a needle cleaning apparatus for cleaning a plurality of injector needles. The apparatus comprises a support base having a plurality of holes in which a plurality of needles, which have been previously stuck into meat products for injecting fluids into the meat products, is inserted such that an upper portion of each needle, where an inlet opening is formed, is above the support base and a lower portion of each needle, where a plurality of outlet ports are formed, is below the support base. First the plurality of needles is exposed to a cleaning solution by submerging the lower portions thereof in a cleaning solution contained in a tank. Then the support base with the needles is placed in a backflushing container where a gaseous stream is directed into the needles through the tip and exits the needle through the head, thereby simultaneously backflushing the needles.

A drawback of the apparatus according to the cited document US 2005000550 A1 is that the cleaning solution in not backflushed through the needles and that the support base needs to be moved from the cleaning solution tank to the backflushing container for completing a cleaning operation.

DISCLOSURE OF THE INVENTION

The present invention proposes a needle cleaning system including a needle cleaning machine and a plurality of needles for injecting fluids into meat products. Each needle comprises a hollow shaft having a longitudinal inner passage with a closed tip lower end and a closed upper end, a plurality of side outlet ports formed in a lower portion of said hollow shaft in communication with said inner passage and a side inlet opening formed in an upper portion of the hollow shaft in communication with the inner passage.

The needle cleaning machine of the present invention is useful to carry out a needle cleaning method comprising the insertion of one or more needles in holes of a support base which closes an airtight container such that said outlet ports of the needles are inside the airtight container and said upper side inlet opening of the needles is outside the airtight container, and thereafter carrying out the following steps:

a) feeding a pressurized cleaning solution, such as caustic soda, into said airtight container so as to force said cleaning solution to penetrate through the outlet ports, pass through the inner duct and then exit through the upper inlet opening of said needle or of each needle, and from there pass to a tank for its eventual recovery, so that the cleaning solution cleans the inner duct and the holes of the needles;

b) feeding a pressurized gas, such as air, into said airtight container so as to force said gas to penetrate through the outlet ports, pass through the inner duct and then exit through the upper inlet opening of said needle or of each needle, and from there outwards, in order to eject any cleaning solution that might remain inside the needles;

c) feeding a pressurized washing liquid, such as water, into said airtight container so as to force said cleaning solution to penetrate through the outlet ports, pass through the inner duct and then exit through the upper inlet opening of said needle or of each needle, and from there outwards, so that the washing liquid washes the inner duct and the holes of the needles; and d) feeding again a pressurized gas, such as air, into said airtight container so as to force said gas to penetrate through the outlet ports, pass through the inner duct and then exit through the upper inlet opening of said needle or of each needle, and from there outwards, in order to eject any washing liquid that might remain inside the needles;

Should there be several airtight containers each supporting a group of needles, at least step a) shall be carried out sequentially in each one of the airtight containers, that is to say, one airtight container after the other. Optionally, steps b) and c) may also be carried out sequentially in one airtight container after the other. If necessary, step a) will be carried out one or more times as need may be, for each needle airtight container.

The needle cleaning machine of the present invention comprises one or more airtight containers, each one of them closed at the top by a support base designed to hold at least one group of needles in a position in which said upper portion of the needles, where said inlet opening is located, remains outside said airtight container and said lower portion of the needles, where said outlet ports are located, remains inside the airtight container; a pump in communication with a tank of cleaning solution through an intake duct and with said airtight container through a drive duct for driving the cleaning solution from the tank to the airtight container; an air supply duct which communicates an air-supply source with the airtight container for supplying pressurized air to the airtight container; a washing-liquid supply duct which communicates a source of washing liquid supply with the airtight container for supplying washing liquid to the airtight container; and valves installed in said ducts for opening and closing fluid passage therethrough.

A is tray arranged so as to collect fluids coming out of the inlet opening located in the upper portion of each needle, and a drain pipe is connected to said tray for draining the fluids collected on the tray.

Preferably, and especially when there is a plurality of airtight containers, the drive duct, the air supply duct, and the washing-liquid supply duct are in communication with a collector duct, and the collector duct is in communication with each one of the airtight containers via respective feed ducts provided with valves for opening and closing fluid passage through them.

Each support base comprises a plurality of holes suitable for the insertion of respective needles, and each one of said holes is provided with a sealing gasket for sealing an interface between the needle and the support base. In addition, the airtight container is fastened to the support base in cooperation with sealing elements which seal a joint between the airtight container and the base support, such that the only way out for the fluids injected under pressure into the airtight container is along the inner passage and through the inlet opening of the needles that are being washed.

The needle cleaning machine may comprise, for example, a body in which it is possible to distinguish an upper compartment, a lower compartment and a side compartment, which includes said tank containing the cleaning solution. A tray that constitutes a bottom of the upper compartment separates the upper and lower compartments. This tray collects the liquids that come out of the needles and is connected to a drain pipe for draining the collected liquids. In addition, the tray supports the aforementioned support bases in a position in which the upper portion of the needles, where the inlet opening is located, is inside the upper compartment and said airtight container is in the lower compartment. The drive pump, the collector ducts, the drive duct, the air supply duct, and the washing-liquid supply duct are housed in the lower compartment.

The upper compartment is provided with two covers: one outer cover for closing thereof, and an inner cover, which can be adjusted in height, designed to abut against the closed upper end of the needles supported on the support bases. The weight of this inner cover prevents the needles from sliding upwards during washing operation due to the pressure of the liquids injected into the airtight containers.

BRIEF DESCRIPTION OF THE DRAWINGS

With the aim of facilitating understanding of the proposed invention, a detailed description of an embodiment is provided by way of non-limiting example with reference to the accompanying drawings, in which.

DETAILED DESCRIPTION OF A PREFERRED EMBODIMENT OF THE INVENTION

Figure 1:
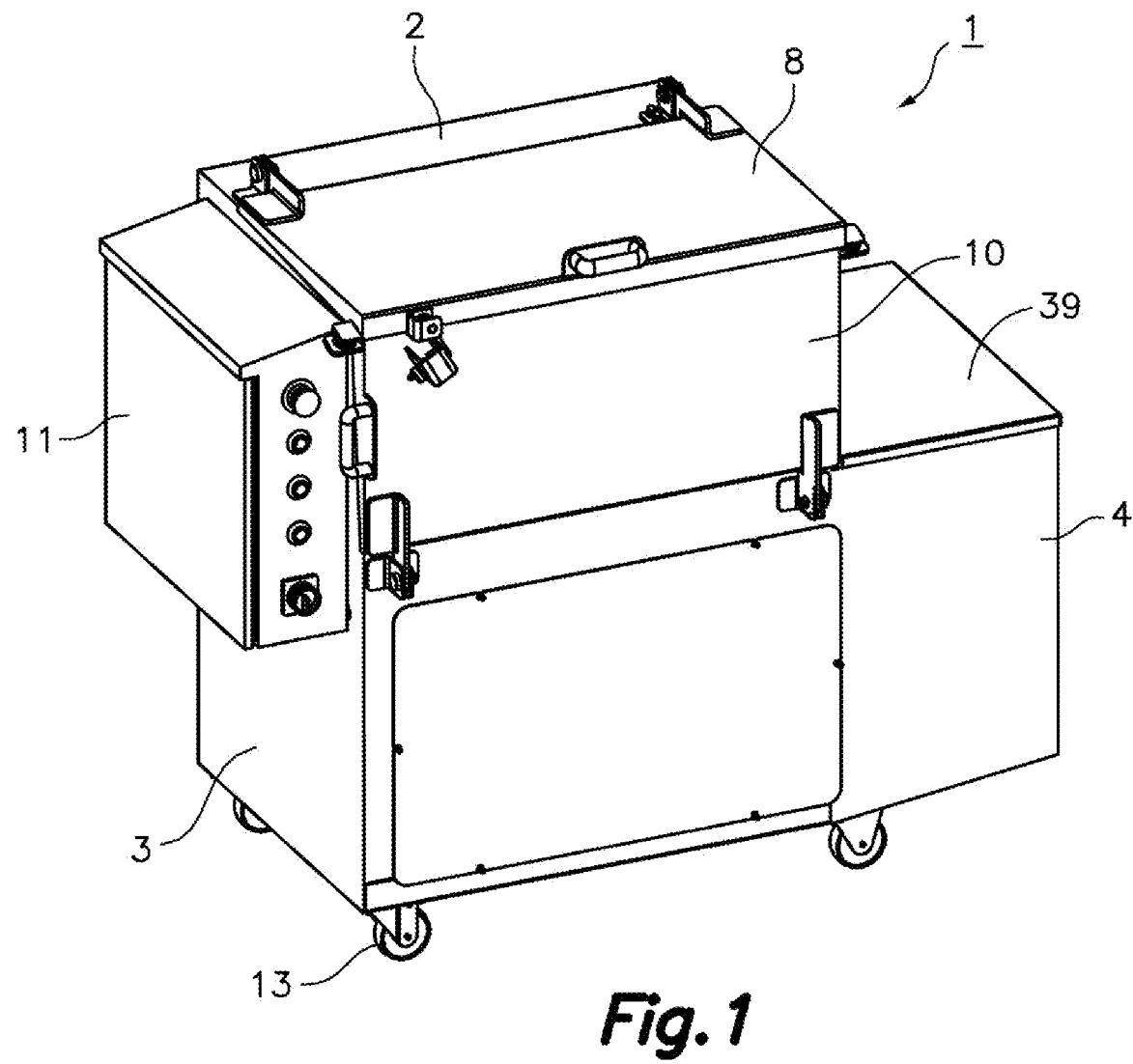
FIG. 1 is a perspective view of a needle cleaning machine making part of a needle cleaning system for cleaning needles for injecting fluids into meat products according to an embodiment of the present invention, when closed.
Figure 2:
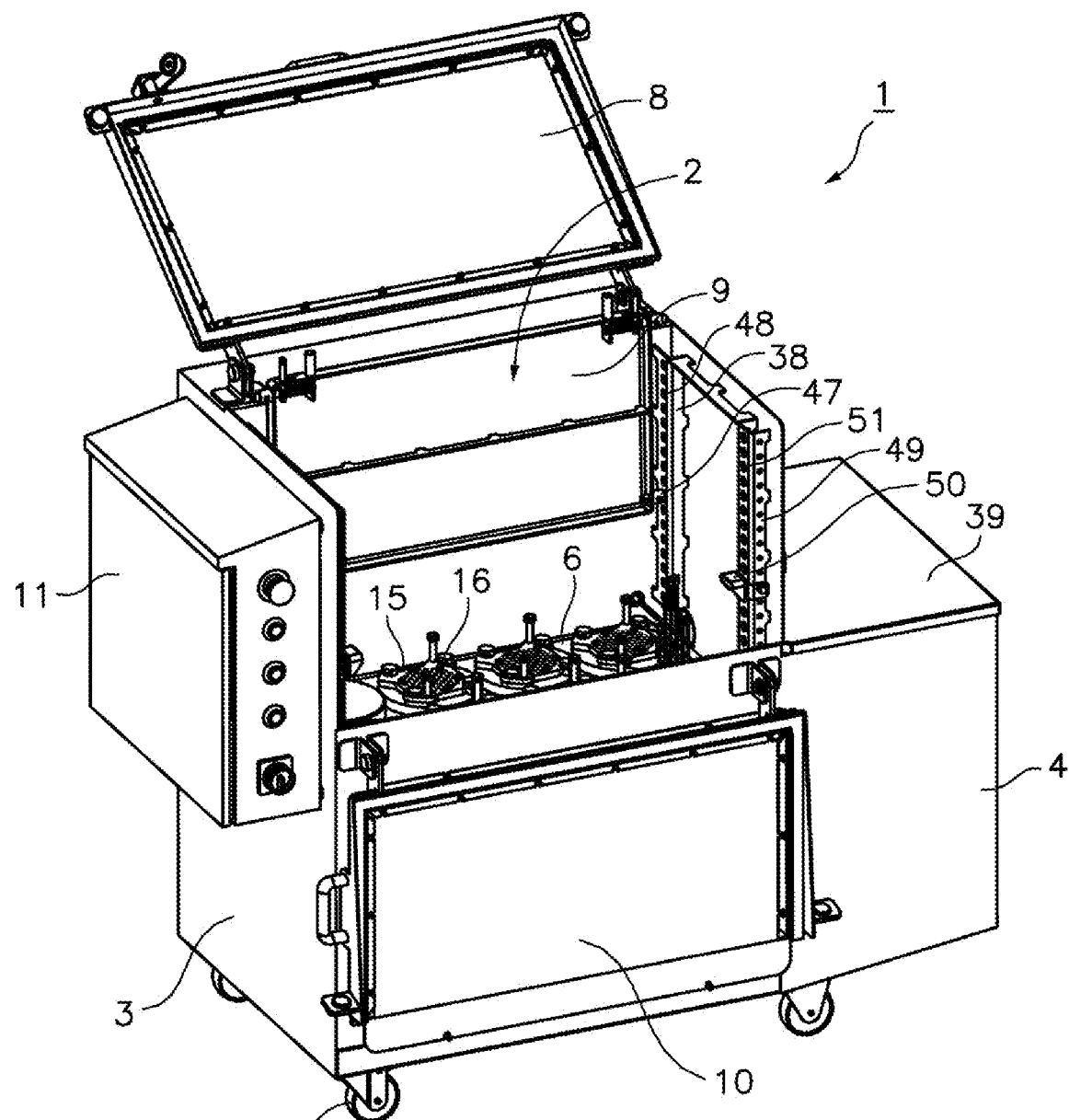
FIG. 2 is a perspective view of the needle cleaning machine shown in FIG. 1 with an outer and an inner cover, open so as to partially show the inside thereof.

Referring first to FIGS. 1 and 2, the reference sign 1 generally designates a needle cleaning machine according to an embodiment of the present invention, which comprises a main body including an upper compartment 2, a lower compartment 3 and a side compartment including s tank 4 provided with a tank cover 39. The upper 2 and lower 3 compartments are separated by a tray 6 formed by a horizontal intermediate partition wall that constitutes the bottom of the upper compartment 2. The upper compartment 2 has an upper outer cover 8 that provides access therein and an inner cover 9 the function of which is explained below.

In the embodiment shown in FIGS. 1 and 2, the upper compartment 2 has in addition a hinged front wall 10 that can be opened towards the front, which further facilitates access inside the upper compartment 2. In an alternative embodiment (not shown), instead of the hinged front wall, at least one portion of the front wall of the compartment 2 forms an integral part of the outer cover 8 and moves upwards together with the same when the outer cover 8 is opened to provide easy access to the upper compartment 2.

The lower compartment 3 houses various members, which will be listed below with reference to FIG. 3, necessary for the cleaning treatment of the needles. A cabinet 11 for the electrical control panel completes the needle cleaning machine, as well as lower wheels 13.

The needles 40 worked upon by the needle cleaning machine 1 of the present invention are of a well-known specific type, as the one described for example in document U.S. Pat. No. 5,507,221.

Figure 4:
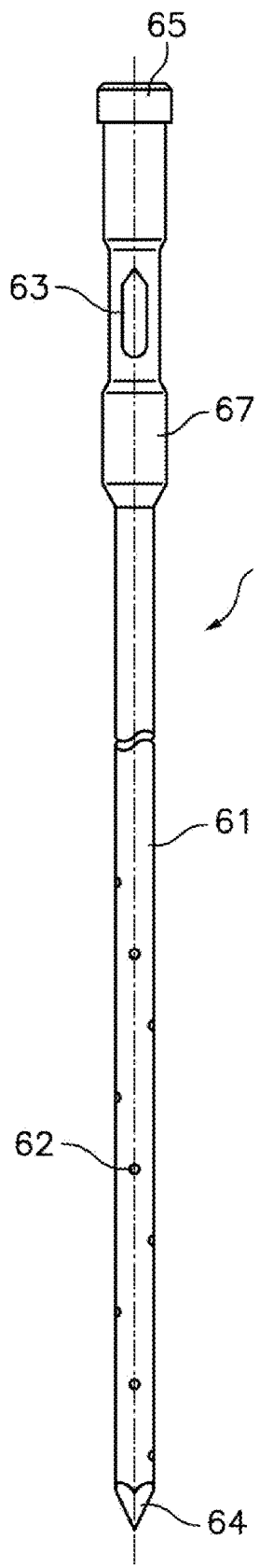
FIG. 4 is a side view of one of the needles worked upon by the needle cleaning machine.
Figure 5:
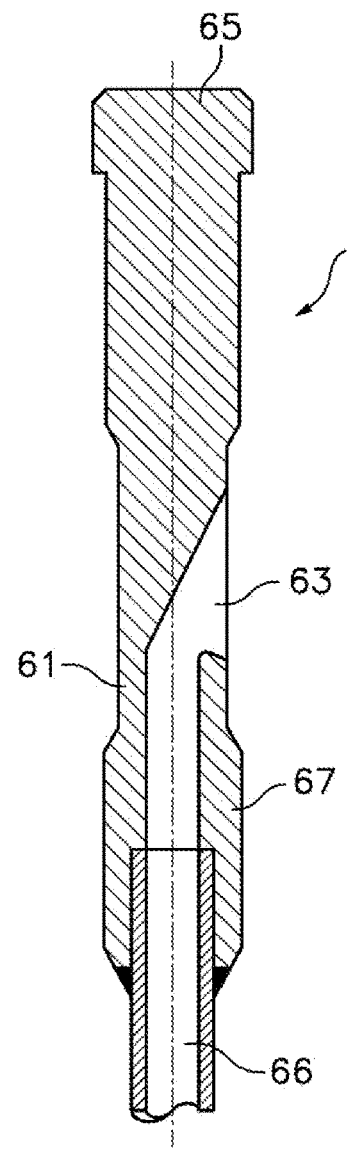
FIG. 5 is a partial cross-sectional view of an upper portion of the needle of FIG. 4.
Figure 6:
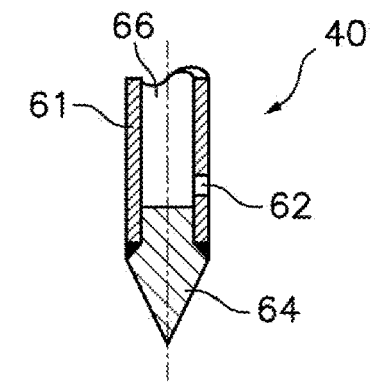
FIG. 6 is a partial cross-sectional view of a lower portion of the needle of FIG. 4.

As shown in FIGS. 4, 5 and 6, each needle 40 comprises a hollow shaft 61 having a longitudinal inner passage 66 with a closed tip lower end 64 and a closed upper end 65, a plurality of side outlet ports 62 formed in a lower portion of the hollow shaft in communication with the inner passage 66 and a side inlet opening 63 formed in an upper portion of the hollow shaft in communication with the inner passage 66. The closed tip lower end 64 of the needle 40 forms a pointed tip and the closed upper end 65 defines a top flat surface. The hollow shaft 61 has a bulged portion 67 below the inlet opening 63 and a smooth portion without outlet ports 62 between the bulged portion 67 and the lower portion with outlet ports 62.

Each needle 40 can be made as one single part o by joining different pats, for example by welding.

The needles 40 to be cleaned have been previously stuck into meat products for injecting fluids into the meat products and therefore meat particles and organic fluids can remain retained in the inner passage 66 and outlet ports 62 of the needles 40.

The tray 6 forming the bottom of said upper compartment 2 of the machine body supports a plurality of support bases 15. Each support base 15 has a plurality of holes 16 for inserting the needles 40, and each hole 16 is provided with a sealing gasket 69.

Figure 7:
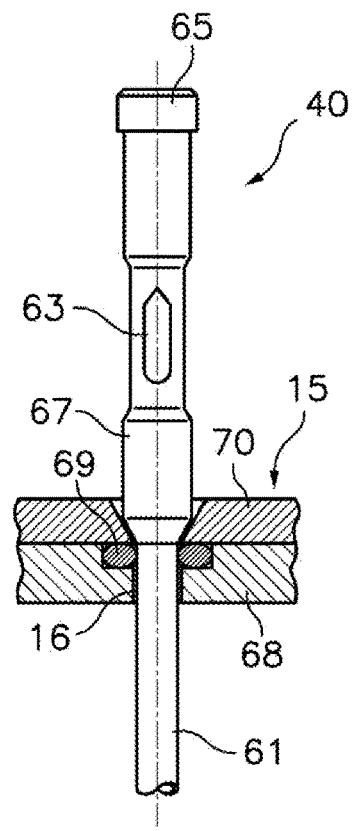
FIG. 7 is a partial cross-sectional view of the needle inserted in a work position in a hole of a support base which is part of the needle cleaning machine of FIGS. 1, 2 and 3.

As shown in more detail in FIG. 7, in this example of embodiment, the support base 15 comprises a lower plate 68 and an upper plate 70 attached to one another, for example by bolts (not shown). The lower plate 68 and the upper plate 70 have a plurality of mutually aligned holes defining together the mentioned holes 16. The lower plate 68 has an upper surface with an annular recess around each hole. The sealing gaskets 69 are located in the recesses, and a lower surface around each hole of the upper plate 70 keeps the gaskets 69 retained preferably under compression in the recesses. Alternative mechanical solutions will readily occur to one skilled person to retain the gaskets in the support plate.

The diameter of the holes 16 in the support base 15 is lesser than the diameter of the bulged portion 67 of the needles 40 and the inner diameter of the sealing gasket 69 is lesser than the diameter of the smooth portion of the needles 40. Therefore, in the work position shown in FIG. 7, the bulged portion 67 of the needles 40 abuts the support base 15 providing a stop for insertion of the needles 40 in the corresponding holes 16 of the support base 15 and the sealing gaskets 69 are pressed against the smooth portion of the needles 40 thereby sealing the needles 40 with respect to the corresponding holes 16.

The tray 6 has a drain connected to a drain pipe 36, which communicates with the tank 4 located in the side compartment.

Figure 3:
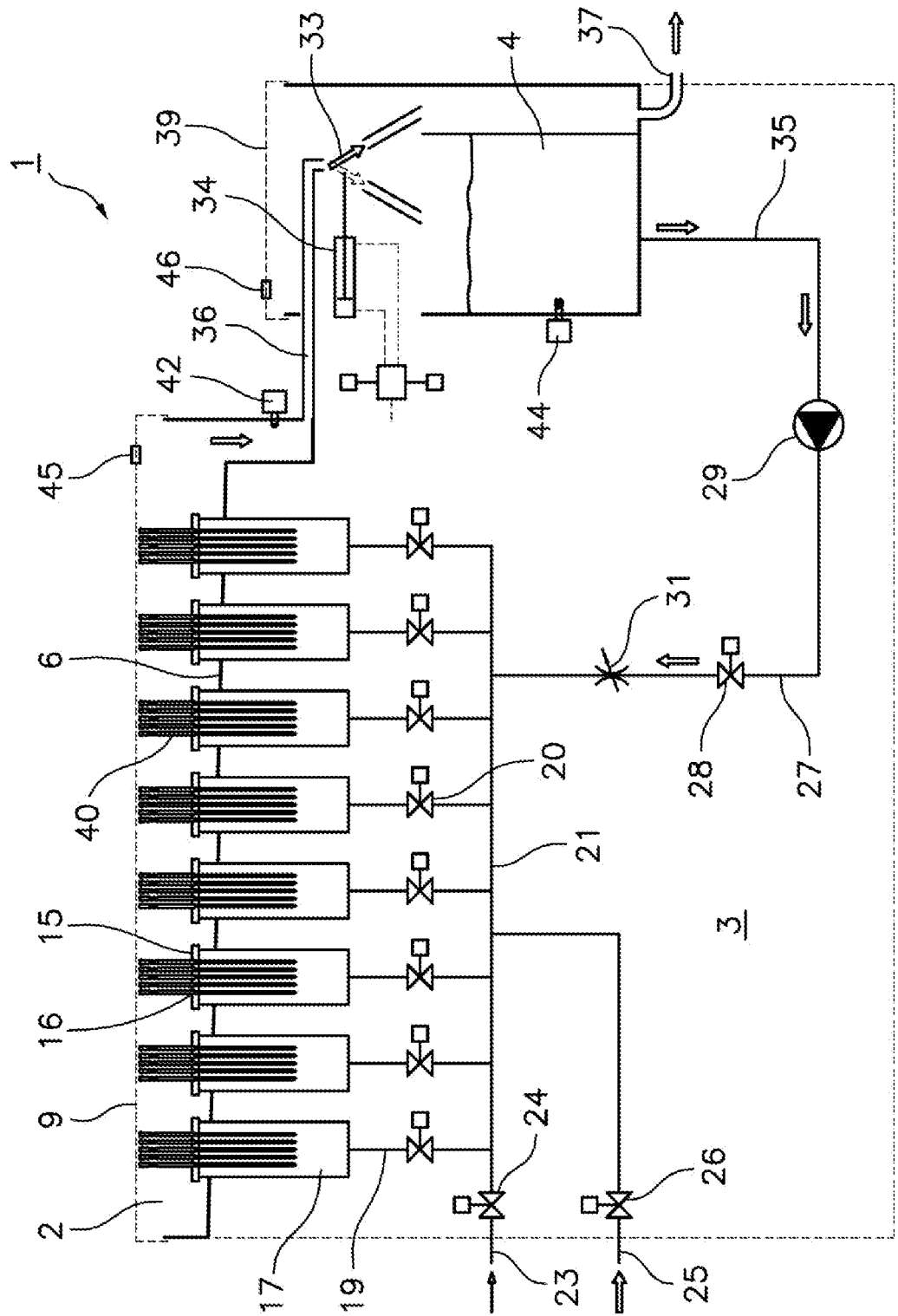
FIG. 3 is a schematic representation of the main components of the needle cleaning machine and their connections.

Referring now to FIG. 3, the lower compartment 3 contains a series of airtight containers 17, each one of which is hermetically sealed at the top by one of said support bases 15 in cooperation with sealing elements. In the illustrated embodiment, there is a plurality of airtight containers 17 and these are connected in their lower portion to respective feed ducts 19, which in turn are connected in parallel to a collector duct 21. An air supply duct 23 that communicates with a source of pressurized air supply, and a washing-liquid supply duct 25 that communicates with a source of washing-liquid supply are connected to the collector duct 21 for supplying pressurized air and washing liquid to the sealed containers 17. A pump 29 has a suction inlet connected to a suction duct 35 that communicates with the aforementioned tank 4 and a drive outlet connected to a drive duct 27 that communicates with the collector duct 21 for driving the cleaning solution from the tank 4 to the sealed containers 17.

Each one of the feed ducts 19 connected to the airtight containers 17 has a respective valve 20 for opening and closing fluid passage therethrough. Likewise, the air supply duct 23 and the washing-liquid supply duct 25 have also respective valves 24 and 26 for opening and closing fluid passage therethrough. The drive duct 27 coming from the pump 29 has another valve 28 for opening and closing liquid passage therethrough, as well as, a flow regulating device 31. The opening and closing of said valves is actuated by actuation devices and controlled automatically by the electrical control panel housed in said cabinet 11.

The aforementioned drain pipe 36 of the tray 6 forming the bottom of the upper compartment 2 communicates with the tank 4 through a deviation device 33, which is actuated by a deviator actuator 34, such as a fluid-dynamic actuator, that shifts the position of said deviation device 33 such that the fluid coming from the drain pipe 36 is poured into the tank 4 or is deviated to an exit point 37 towards the outside the needle cleaning machine.

In practice, when the needles 40 are inserted into the holes 16 of the support bases 15, the lower portion of each needle 40, where the outlet ports 62 are located, is housed inside the respective airtight container 17, whereas the upper portion of each needle 40, where the inlet opening 63 is located, remains, as shown in FIG. 3, above the corresponding support base 15, i.e., outside the airtight container 17 and inside the upper compartment 2.

During a cleaning operation, various groups of needles 40 to be cleaned, all of them identical in diameter and height, are inserted into the respective holes 16 of the support bases 15 closing the airtight containers 17 as shown in FIG. 7. Then, the inner cover 9 is lowered until it abuts against and rests on the top flat surface of the closed upper end 65 of all the needles 40, thus immobilizing them, and then the outer cover 8 is closed.

The inner cover 9 has hinge elements 47 mounted on vertical rear guides 38 (FIG. 2), which have several anchoring points 48 for fixing the hinge elements 47 at different heights. Front cover supports 50 are mounted on vertical front guides 49 which have several anchoring points 51 for fixing the front cover supports 50 at different heights. The inner cover 9 can be pivoted about the hinge elements 47 between an open position, shown in FIG. 2, and a closed position in which a front region of the inner cover 9 rests on the front cover supports 50. The positions of the hinge elements 47 and the front cover supports 50 can be varied along the respective vertical front and rear guides 38, 49 by selecting respective anchoring points 48, 51, so as to be able to adjust the position of the inner cover 9 to needle 40 groups having different heights.

The needle cleaning machine of the present invention is useful to carry out a method for cleaning needles for injecting fluids into meat products comprising firstly successively injecting a cleaning solution, such as for instance a diluted caustic soda (NaOH) solution, coming from the tank 4 into each airtight container 17 by means of the pump 29 and applying an alternating actuation to the valves 20. Thanks to the hermetical conditions of the airtight containers 17, the cleaning solution will penetrate through the outlet ports 62, pass through the inner passage 66 and exit through the inlet opening 63 of all the needles 40 arranged in each airtight container 17, thus cleaning them.

The cleaning solution coming out of the inlet opening 63 of the needles 40 lastly falls into the tray 6 that forms the bottom of the upper compartment 2, and is directed by the drain pipe 36 again towards the tank 4, from where it can be recycled once again towards the pump 29. Optionally, by shifting the position of the deviation device 33, the inlet opening 63 solution coming from the drain pipe 36 can be ejected outside through the exit point 37.

This operation will be repeated, as the machine operator sees fit, one or more times for each one of the airtight containers 17. Afterwards, the needles 40 in each one of the remaining airtight containers 17 will be treated accordingly in succession, by opening the corresponding valve 20 and closing the valve 20 of the other containers. The flow regulator 31 in the drive duct 27 shall be adequately adjusted, the valve 28 in the drive duct 27 will be open and the valves 24, 26 in the air supply duct 23 and the washing-liquid supply duct 25 will be closed.

After having injected the cleaning solution successively into all the airtight containers 17 and having repeated the operation, when necessary, for one or more of them, the valve 28 in the drive duct 27 will be closed and the valve 24 in the air supply duct 23 will be opened to successively inject into each one of the airtight containers 17 pressurized air coming from a source of pressurized air supply, such as for example a compressor external to the needle cleaning machine. This is achieved by applying an alternating actuation to the valves 20 in the feed ducts 19.

The air injected into each airtight container penetrates through the outlet ports 62, passes along the entire length of the inner passage 66 and exits through the upper inlet opening 63 of each needle 40, and then expands across all the upper compartment, passes through the drain pipe 36 and finally is deviated outwards by the deviator 33, which will be conveniently actuated so as to direct it towards the exit point 37.

Then, said valve 24 in the air supply duct 23 will be closed and the valve 26 in the washing-liquid supply duct 25 will be opened, such that by applying an alternating actuation to the valves 20 the washing liquid will be injected successively into each airtight container 17 and will penetrate accordingly through the outlet ports 62, pass along the entire length of the inner passage 66 and exit through the upper inlet opening 63 of each needle 40 in order to clean each one of them. This washing liquid, preferably water, after exiting through the upper inlet opening 63 of each needle, will fall into the tray 6 that forms the bottom of the upper compartment 2, pass through the drain pipe 36 and be deviated outwards by means of the deviator 33, to a spillway for example, through the exit point 37.

Finally, the valve 26 in the washing-liquid supply duct 25 will be closed and the valve in the air supply duct 23 will be opened again to inject pressurized air coming from the source of pressurized air supply into each one of the airtight containers 17.

The described electric and hydraulic circuits are supplemented with a return liquid sensor 42 located in the drain pipe 36 for sensing passage of return liquid through the drain pipe 36, a safety-level sensor 44 located in the tank 4 for sensing a liquid level therein, a first electromagnetic safety device 45 for sensing an open or closed state of the inner cover 9, and a second electromagnetic safety device 46 for sensing an open or closed state of the tank cover 39 which closes the top of the tank 4.

A person skilled in the art may introduce changes and modifications in the described exemplary embodiments without departing from the scope of the invention as defined in the attached claims.

The invention claimed is:

1. A needle cleaning system including a needle cleaning machine and a plurality of needles for injecting fluids into meat products, each of said needles comprising:
a hollow shaft having a longitudinal inner passage with a closed tip lower end and a closed upper end;
a plurality of outlet ports formed in a lower portion of said hollow shaft in communication with said inner passage; and
an inlet opening formed in an upper portion of the hollow shaft in communication with the inner passage, the needle cleaning machine comprising:
a plurality of containers and a plurality of support bases, with each container being closed at a top thereof by one of the support bases, and with each one of the support bases holding one group of the needles in a position in which an upper portion of the needles, where the inlet opening is located, is placed outside the corresponding container and a lower portion of the needles, where the plurality of outlet ports is located, is placed inside the corresponding container,
a collector duct which is in communication with each one of the plurality of containers through a respective feed duct,
a pump in communication with a tank of cleaning solution through an intake duct and in communication with said collector duct through a drive duct for driving the cleaning solution,
an air-supply duct, which communicates an air-supply source with the collector duct,
a washing-liquid supply duct, which communicates a source of washing liquid supply with the collector duct,
valves installed in each of the feed ducts, the drive duct, the air supply duct, and the washing-liquid supply duct for opening and closing fluid passages therethrough;
a tray arranged so as to collect fluids coming out of the inlet opening located in the upper portion of each one of the needles of the groups of needles held by the plurality of support bases;
a drain pipe connected to said tray for draining the fluids collected on the tray; and
a machine body including an upper compartment, a lower compartment and a side compartment, wherein said side compartment includes said tank of cleaning solution, wherein said upper and lower compartments are separated by the tray, which constitutes a bottom of the upper compartment, wherein said tray is connected to the drain pipe and supports said plurality of support bases of the plurality of containers in a position in which the upper portion of the needles, where the inlet opening is located, is inside the upper compartment and said plurality of containers are in the lower compartment, and wherein said pump, said collector duct, said feed ducts, said drive duct, said air supply duct, and said washing-liquid supply duct are housed in the lower compartment.

2. The needle cleaning system according to claim 1, wherein each of said support bases comprises a plurality of holes suitable for the insertion of respective needles, and each one of said holes is provided with a sealing gasket for sealing the needle with respect to the hole.

3. The needle cleaning system according to claim 2, wherein the hollow shaft of each needle has a bulged portion below the inlet opening and a smooth portion without side outlet ports between the bulged portion and the lower portion, the holes in each of the support bases have a diameter lesser than a diameter of the bulged portion of the needles, and the bulged portion of the needle abuts the support base forming a stop for insertion of the needle in the corresponding hole of the support base and the sealing gasket provides sealing pressure against the smooth portion of the needle.

4. The needle cleaning system according to claim 1, wherein said drain pipe ends in a deviation device actuated by a deviator actuator capable of moving said deviation device to selectively direct the fluid coming from the drain pipe towards the tank of cleaning solution or towards an exit point that drains out of the needle cleaning machine.

5. The needle cleaning system according to claim 1, wherein the upper compartment is provided with an outer cover for closing the same, and an inner cover movable between an open position and a closed position in which said inner cover abuts against the closed upper end of the needles supported on the support bases.

6. The needle cleaning system according to claim 5, wherein said inner cover has at a rear side thereof hinge elements mounted on vertical rear guides in the machine body, the vertical rear guides being provided with several anchoring points for fixing the hinge elements at various heights, and front supports for a front side of the inner cover are mounted on vertical front guides in the machine body, the vertical front guides having several anchoring points for fixing the front supports for the front side of the inner cover at different heights, whereby the inner cover can be adjusted in height.

7. The needle cleaning system according to claim 5, wherein the inner cover is provided with an electromagnetic safety device sensing an open or closed state of the inner cover.

8. The needle cleaning system according to claim 1, wherein said valves installed in the feed ducts, the drive duct, the air supply duct, and the washing-liquid supply duct for opening and closing corresponding fluid passages therethrough are valves actuated by automatically controlled actuation devices.

9. The needle cleaning system according to claim 1, further comprising a safety-level sensor device sensing a liquid level in the tank of cleaning solution.

10. The needle cleaning system according to claim 1, further comprising a return liquid sensor sensing passage of return liquid in the drain pipe.

11. The needle cleaning system according to claim 1, wherein the tank of cleaning solution has a tank cover provided with an electromagnetic safety device sensing an open or closed state of the tank cover.

* * * * *